US012147347B2

(12) United States Patent
Wu et al.

(10) Patent No.: US 12,147,347 B2
(45) Date of Patent: Nov. 19, 2024

(54) SYSTEM AND METHOD FOR PERFORMING CACHING IN HASHED STORAGE

(71) Applicant: Samsung Electronics Co., Ltd., Gyeonggi-do (KR)

(72) Inventors: Chun-Chu Chen-Jhy Archie Wu, San Carlos, CA (US); Sumanth Jannyavula Venkata, Pleasanton, CA (US); Young deok Kim, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 22 days.

(21) Appl. No.: 18/087,554

(22) Filed: Dec. 22, 2022

(65) Prior Publication Data

US 2024/0061784 A1 Feb. 22, 2024

Related U.S. Application Data

(60) Provisional application No. 63/399,025, filed on Aug. 18, 2022.

(51) Int. Cl.
*G06F 12/00* (2006.01)
*G06F 12/0864* (2016.01)
*G06F 12/0895* (2016.01)

(52) U.S. Cl.
CPC ...... *G06F 12/0864* (2013.01); *G06F 12/0895* (2013.01); *G06F 2212/1016* (2013.01)

(58) Field of Classification Search
CPC ......... G06F 12/0864; G06F 2212/1016; G06F 12/0895
See application file for complete search history.

(56) References Cited

U.S. PATENT DOCUMENTS

| | | | | |
|---|---|---|---|---|
| 5,530,958 | A | 6/1996 | Agarwal et al. | |
| 7,093,099 | B2 | 8/2006 | Bodas et al. | |
| 8,874,842 | B1 | 10/2014 | Kimmel et al. | |
| 9,165,005 | B2 | 10/2015 | Beaverson et al. | |
| 10,157,137 | B1 * | 12/2018 | Jain | G06F 12/0864 |
| 10,346,315 | B2 | 7/2019 | Teotia et al. | |
| 10,515,064 | B2 | 12/2019 | Bennett et al. | |
| 10,803,039 | B2 | 10/2020 | Teotia et al. | |
| 11,003,625 | B2 | 5/2021 | Duan et al. | |
| 2008/0028139 | A1 | 1/2008 | Cypher | |
| 2009/0292880 | A1 * | 11/2009 | Usui | G06F 12/0864 711/E12.001 |
| 2015/0012719 | A1 | 1/2015 | Tune | |

(Continued)

FOREIGN PATENT DOCUMENTS

CN 104809179 7/2015

OTHER PUBLICATIONS

European Search Report dated Jan. 2, 2024 issued in counterpart application No. 23190352.7-1224, 8 pages.

*Primary Examiner* — John A Lane
(74) *Attorney, Agent, or Firm* — The Farrell Law Firm, P.C.

(57) ABSTRACT

A method of a memory device is provided. The method includes identifying a tag address of a tag memory based, at least partially, on a source index; accessing a cache storage address corresponding to the tag address; comparing tag memory content and at least part of the source index to identify whether a match exists or whether a conflict exists; and in response to identifying whether the match exists or whether the conflict exists, obtaining information from the cache storage address.

17 Claims, 14 Drawing Sheets

(56) References Cited

U.S. PATENT DOCUMENTS

| | | | | |
|---|---|---|---|---|
| 2015/0212945 | A1* | 7/2015 | Jain | G06F 12/0864 711/128 |
| 2015/0234664 | A1* | 8/2015 | Kim | G06F 9/3838 712/216 |
| 2016/0147669 | A1* | 5/2016 | Huang | G06F 12/1018 711/128 |
| 2016/0259730 | A1* | 9/2016 | Svendsen | G06F 12/0864 |
| 2020/0226099 | A1 | 7/2020 | Vemulapalli et al. | |
| 2021/0201974 | A1* | 7/2021 | Asadi | G11C 11/1659 |
| 2021/0271389 | A1 | 9/2021 | Xia | |
| 2021/0303467 | A1 | 9/2021 | Mandal et al. | |
| 2022/0075766 | A1 | 3/2022 | Levy et al. | |
| 2023/0289300 | A1* | 9/2023 | Wu | G06F 3/061 |

* cited by examiner

| FIG. | Mode | Class 1 Tag Index | Class 2 Tag structure | Cache Hit Rate (%) | Hash Conflict (%) | 1st-Tier Memory SRAM Access | 2nd Tier Memory 1st DRAM Access HOL access | 2nd Tier Memory 2nd DRAM Access Hash Conflict access | Total (Max 140 ns) |
|---|---|---|---|---|---|---|---|---|---|
| - | Non-Cache (Baseline) | - | - | 0% | 50% | - | 100% x 70ns | 100% x 50% x70ns | 105 ns |
| 3 | Cache | Source Index | Direct Map | 30% | 50% | 30% x 5ns | 70% x 70ns | 70% x 50% x70ns | 75 ns |
| 4 | | | 2~4Way | 50% | 50% | 50% x 5ns | 50% x 70ns | 50% x 50% x70ns 70% x 50% x70ns | 55 ns |
| 5 | | | Configurable Tag | 60% | 50% | 60% x 5ns | 40% x 70ns | 40% x 50% x70ns | 45 ns |
| 6 | | Hash Index | Chaining | 80% | 50% | 80% x 5ns | 20% x 70ns | 20% x 50% x70ns | 25 ns |
| 7 | | | Chaining X-Way | 90% | 50% | 90% x 5ns | 10% x 70ns | 10% x 50% x70ns | 15 ns |
| 8 | | | Double Hash | 95% | 50% | 95% x 5ns | 5% x 70ns | 5% x 50% x70ns | 10 ns (best) |

FIG. 9

| FIG. | Mechanism | Application | Hash Conflict | Cache Entry | Cache RAM | Tag RAM |
|---|---|---|---|---|---|---|
| 3 | Source index | Direct Map | N/A | 1024 (10 bit) | 512 x1024 | 14 x1024 |
| 4 | | 2 Way | | 1024 (10 bit) | 512 x1024 | 15 x512 x2 |
| 5 | | Configurable | | 1024 (10 bit) | 512 x1024 | 14 x1024 |
| 6 | Hash index | Chaining Hash | Yes | 1024 (10 bit) | 512 x1024 | 24 x1024 |
| 7 | | Chaining Hash + 2Way | Yes | 1024 (10 bit) | 512 x1024 | 24 x512 x2 |
| 8 | | Double Hash | No | 1024 (10 bit) | 512 x1024 | 24 x1024 |

SYSTEM AND METHOD FOR PERFORMING CACHING IN HASHED STORAGE

PRIORITY

This application is based on and claims priority under 35 U.S.C. § 119(e) to U.S. Provisional Patent Application Ser. No. 63/399,025, filed on Aug. 18, 2022, the entire contents of which are incorporated herein by reference.

TECHNICAL AREA

The present disclosure relates generally to memory devices and improving access speed for hashed storage systems.

BACKGROUND

Files are a type of data structure that are used by applications to manage user data. As such, efficient processing, storage, security, and general management of the data is important to information technology (IT) systems. Applications use and depend upon file systems, operating systems (OSs), and other such system software for file management and access related operations.

Storage devices (e.g., persistent data storage devices such as solid state drives (SSDs)) for modern IT infrastructure are increasing in popularity, as vast amounts of data are being generated by various applications, such as, for example, Internet of things (IOT), social networks, autonomous vehicles, etc. NAND flash media based SSD storage devices are also components of the IT infrastructure.

When applications require data, the desired data portions of stored files are accessed. The speed at which the desired data portions are accessed may be of particular importance so that the data may be quickly accessed, to improve the overall throughput of the performance and user experience of applications (e.g., gaming and online shopping applications).

SUMMARY

The present disclosure has been made to address at least the disadvantages described above and to provide at least the advantages described below.

According to an aspect of the disclosure, a method of a memory device is provided. The method includes identifying a tag address of a tag memory based, at least partially, on a source index; accessing a cache storage address corresponding to the tag address; comparing tag memory content and at least part of the source index to identify whether a match exists or whether a conflict exists; and in response to identifying whether the match exists or whether the conflict exists, obtaining information from the cache storage address.

According to another aspect of the disclosure, a system includes a memory and a controller. The controller is configured to identify a tag address of a tag memory based, at least partially, on a source index; access a cache storage address corresponding to the tag address; compare tag memory content and at least part of the source index to identify whether a match exists or whether a conflict exists; and in response to identifying whether the match exists or whether the conflict exists, obtain information from the cache storage address.

According to another aspect of the disclosure, a storage device includes a controller and a storage medium. The controller is configured to identify a tag address of a tag memory based, at least partially, on a source index; access a cache storage address corresponding to the tag address; compare tag memory content and at least part of the source index to identify whether a match exists or whether a conflict exists; and in response to identifying whether the match exists or whether the conflict exists, obtain information from the cache storage address.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 9 illustrates a table comparing the benefits of the embodiments provided by FIGS. 3-8, according to an embodiment;

FIG. 10 illustrates a table comparing the sizes of the memories provided by embodiments of FIGS. 3-8, according to an embodiment;

DETAILED DESCRIPTION

Figure 1:
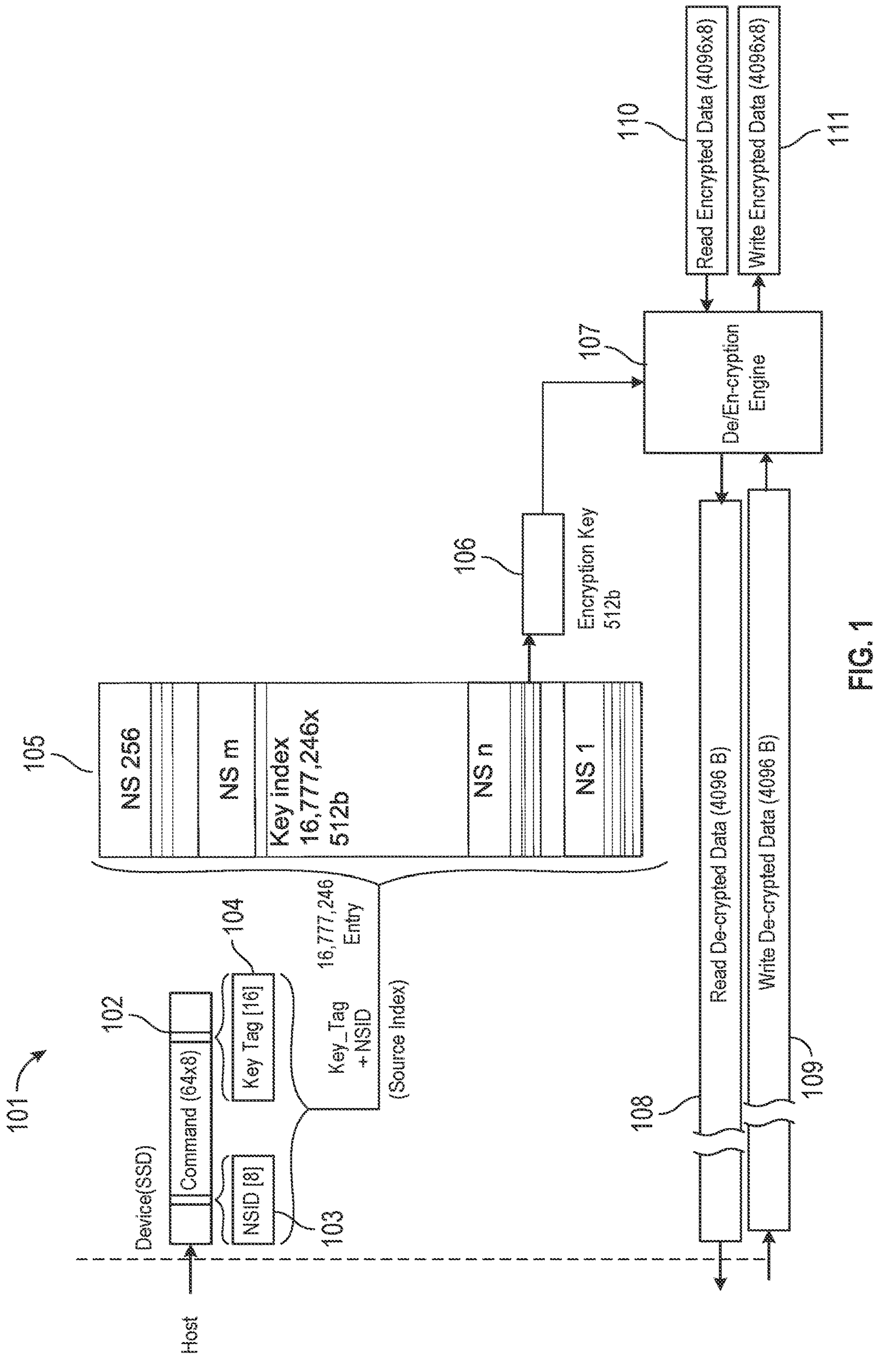
FIG. 1 is a block diagram illustrating a key per input output (KPIO) system, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices utilizing storage devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2$^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

For secure data storage, user accessible data should be protected, which can require encryption and decryption. A memory storage system may allow a host device to select either an encryption or decryption key for every input/output (IO) command, referred to as key per IO (KPIO).

Self-encrypting drives (SED) may perform continuous encryption on user accessible data. This is done at interface speeds using a small number of keys generated/held in persistent media by the storage device. KPIO may utilize a large number of encryption keys to be managed and securely downloaded into a non-volatile memory subsystem. Encryption of user data may occur on a per command basis (each command may request the use a different key).

In order to efficiently store encrypted data, a hash function may be used. Hash functions take an arbitrarily long string of bytes and produce a shorter fixed size result. For example, a first key type may be input to a hash function to output a shorter fixed size result (e.g., a hash value). A hash value may be an index for a specific element stored in memory. A hash table may be used to store hash values corresponding to the first key type and value pairs in a list that is accessible through its index. The values in the hash table (paired with the hash value of the first key type) may be a second key type used for KPIO. Therefore, when the values in the hash table are the second key type used for KPIO, the values may be used to encrypt/decrypt data to perform read/write commands. Additionally, the values in the hash table (paired with the hash value of the first key type) may be include one or more data objects.

Memory storage systems often require a large number of possible keys for storage but a relatively small fraction of them may be used during memory read/write operations. Thus, memory storage may be inefficient because larger than required memory spaces may be allocated for storing the large number of keys, thereby increasing the cost and power consumption of such designs. In addition, inefficient designs may also cause slow reading and writing of data.

A method to accelerate lookup speed of a frequently used hashed key-value in a 1$^{st}$ tier (e.g., a memory having a relatively fast access time (e.g., static read only memory (SRAM) or on-chip memory))) while complete sets of key-values are stored in a 2$^{nd}$ tier memory (e.g., a memory having a relatively slow access time (e.g., dynamic read only memory (DRAM))) is provided. For example, at least a part of a hashed index or a source address may be used as an identification tag to locate a cache hit, and to reduce the lookup duration. This cache tag-identification operation may be performed in a smaller-n-packed 1$^{st}$ tier memory (e.g., a faster memory). Accordingly, memory lookup speed may be improved since it may not necessarily be limited by 2$^{nd}$ tier memory (e.g., a slower memory) throughput. 1$^{st}$ tier memory (e.g., with relatively faster memory access times) may be referred to as "primary memory" and 2$^{nd}$ tier memory (e.g., with relatively slower memory access times) may be referred to as "secondary memory".

FIG. 1 is a block diagram illustrating a key per input output (KPIO) system, according to an embodiment. Throughout FIG. 1, some of the components include a number of bits (b) or bytes (B) corresponding to each component (e.g., Command (64×8 b) and/or encryption key 64 B). The number of bits or bytes corresponding to each component is exemplary and is provided to aid in the understanding of the drawings. In particular, the size of each of the components may be used for illustrative purposes to help understand the physical relationships among components. The actual number of bits, bytes, or entries for each component may vary, depending on the needs of the system.

A KPIO system 101 may be a {key, value} system. The {key, value} system may store data as a collection of key-value pairs in which the key serves as a unique identifier to the value. The value may be made up of a fixed number of bits (e.g., 512 bits) and may represent a security key (e.g., a private key) for encrypting or decrypting data (Note, the key included in the "{key, value}" pair may be a different type of key than the security key included in the "value" field.). An Advanced Encryption Standard (AES) decryption key may be stored in volatile read only memory, such as a DRAM. The value representative of the security key (e.g., the 512 bit security key) may be addressed by namespace identification (NSID)+key tag.

Referring to FIG. 1, a host may transmit a read or write command 102 to a storage device (e.g., an SSD (e.g., a flash drive)). The command 102 may include an NSID+key tag. The NSID 103 may identify a memory to read to or write from. The NSID 103 may be made up of 8 or more bits. The key tag 104 may be a key index used to index an encrypting/decrypting key for a specific NSID. The system may be composed of more than one NSID and key tags in different NSIDs can overlap. The NSID 103 and the key tag 104 may be combined to form data structure 105 (e.g., a key index, a non-overlapping {key, value} index, an encryption index, a decryption key index, a lookup table, or an array). The data structure 105 may be an AES index. The size of the data structure 105 may be composed of U.S. Pat. No. 16,777,246 (entries)×512 bits, and may be partitioned into a predetermined number of name spaces (NSs) (e.g., 256 NSs of 64 kb each). Each NS may include a number of valid entries which may be linearly incremented. Linearly allocation of valid entries may reduce hit rate and can create a throttle refill due to least recently used (LRU) eviction policy.

Each NS may be indexed across various portions of the entire data structure 105 (this may be called "sparse indexing"), thereby requiring a large number of look-ups to retrieve the information included in a single NS. In this regard, the data structure 105 is large. The data structure 105 includes about 16 million possible entries. However, the system may use 64 thousand valid entries. Thus, the total memory size may be 1 gigabyte (GB), and the total valid memory size may be 4 megabytes (MB). Since the number of valid entries is small relative to the total size of the memory, the memory is sparse. Having a pre-defined fixed/max number of valid keys (e.g., 64 thousand) is a characteristic of KPIO encryption that that uses a limited memory size and a maximum number of lookups in the large and sparse source address space, thereby increasing the importance of relying on an efficient throughput calculation for quickly finding and retrieving valid keys.

The data structure 105 may be used to retrieve a security key 106 (e.g., an AES encryption key or encryption key). The security key 106 may be 64 bytes (512 bits). If the security key 106 is 64 bytes, then it may be large, and may need to be saved on a cache memory or an external memory to be accessed.

A security key 106 may be retrieved and sent to the de/encryption engine 107. Decrypted data (e.g., unencrypted data) may be read 108 or decrypted data may be written 109 from the host to the SSD, and the security key 106 may be used by the de/encryption engine 107 to read encrypted data 110 or write encrypted data 111. The encrypted data 110 or 111 may be 4,096×8 bits and stored in memflash. For example, the encrypted data 110 or 111 may be stored in a remote server (e.g., a cloud server).

A direct address lookup table (LUT) may be used to store key values in the key index 105 in a KPIO system. A direct address LUT addresses each command 102 to a specific address space in the key index 105, however the size of the AES encryption key index 105 must be very large, since a fixed portion of the size of the key index 105 can include valid entries.

Using a content addressable memory (CAM) lookup may be a solution for efficiently obtaining or retrieving key values in a KPIO system. Advantageously, CAM lookup reduces memory storage size of the key index 105 and achieves a fast throughput. Unfortunately, CAM uses a large number of logic gates to enter or retrieve key values, which is expensive. For example, for 64 thousand valid entries, 64 thousand×24 bit comparators may be needed to perform logic functions to redirect a source index to a valid key address space in the key index 105.

Additionally, hash addressing can be used to hash the source index command to a finite size to identify a key storage address of a hash key index (e.g., reducing the index command from 24 to 16 bits). Hash addressing advantageously reduces the memory size of a memory by using a hash key index, since hashed indexes can be stored compactly with a reduced length. Unfortunately, since multiple source keys (e.g., keys from one or more sources to be input into the hash function) may be linked to a single hash index, retrieval of a valid value from the same hash index—may require a conflict resolution operation which may slow throughput.

The hash conflict resolution operation may involve performing a compare operation when using hash indexes to identify storage indexes in a primary memory. If the compare operation matches a hashed index corresponding to a storage address in the primary memory with a source index (e.g., an NSID+key tag), then a linked list may be used to designate a secondary memory address space to associate the hashed index corresponding to the storage address in the primary memory with the source index. In this manner, multiple entries can be associated with the same hashed index using the linked list. Accordingly, the size of the primary memory may be reduced to a small size, since valid entries may be included. However, when a conflict occurs and a linked list is designated, the memory that is allocated to an entry must be expanded. In addition, due to the compare operation, a conflict may occur and accessing the memory may require multiple operations to obtain data from linked lists.

A peripheral component interconnect express (PCIe) link may be used to access memory. The PCIe4×4 standard may use 2 million (M) input/output operations per second (IOPS) or 500 nanoseconds (ns) for one lookup (e.g., read or write). The PCIe4×6 standard may use 8 M IOPS or 125 ns for one lookup. DRAM access may be about 50-70 ns. Thus, using the PCIe4×6 standard, only 1-2 conflict comparisons and/or lookups can be performed per command, which presents a significant bottleneck in lookup speed.

The present application proposes solutions that can efficiently lookup a memory entry (e.g., an encryption key) using 1$^{st}$ tier: cache RAM (e.g., a cache storage), thereby reducing the likelihood needing to access a 2$^{nd}$ tier: external RAM (e.g., a DRAM), which may be slow to access. Thus, the present application proposes reducing the overall throughput time for obtaining a memory entry and minimizes the number of lookup iterations, thereby improving lookup speeds for systems that rely on PCIe IOPS standards.

Moreover, the present application proposes using multiple types of cache comparisons to identify a cache conflict (e.g., a mismatch). A first type of cache conflict may be referred to as a traditional cache conflict resolution. A second type of may referred to as a hash cache conflict resolution. Throughout the disclosure, comparisons are made to identify whether a conflict exists. Each comparison may be, for example, a traditional cache conflict resolution or a hash cache conflict resolution. Other types of comparisons, such as multi-way cache comparisons, may be used too.

A traditional cache comparison (traditional cache conflict resolution) may be between two values: 1. The Tag_Address access/index Tag Memory Content (e.g., 14 bits); and 2. A portion of the source address (e.g., 14 bits=24 bits−10 bits). This type of comparison may be exemplified by step 303 of FIG. 3, discussed below.

A hash cache comparison (hash cache conflict resolution) may be between two values: 1. The Tag_Address access/index Tag Memory Content (e.g., 24 bits) and 2. The full source address (e.g., 24 bits). This type of comparison may be exemplified by 603 of FIG. 6, discussed below For convenience of description, the term "tag memory content" is used in this disclosure. This term refers to a memory content stored in tag memory (e.g., 1$ tier tag RAM). Depending on which of the abovementioned comparisons are used, tag memory content may refer to a different number of bits (e.g., 14 bits in the case of traditional cache conflict resolution, 24 bits in the case of hash cache conflict resolution, etc.), which may be compared with a part, or all, of the source address.

Figure 2:
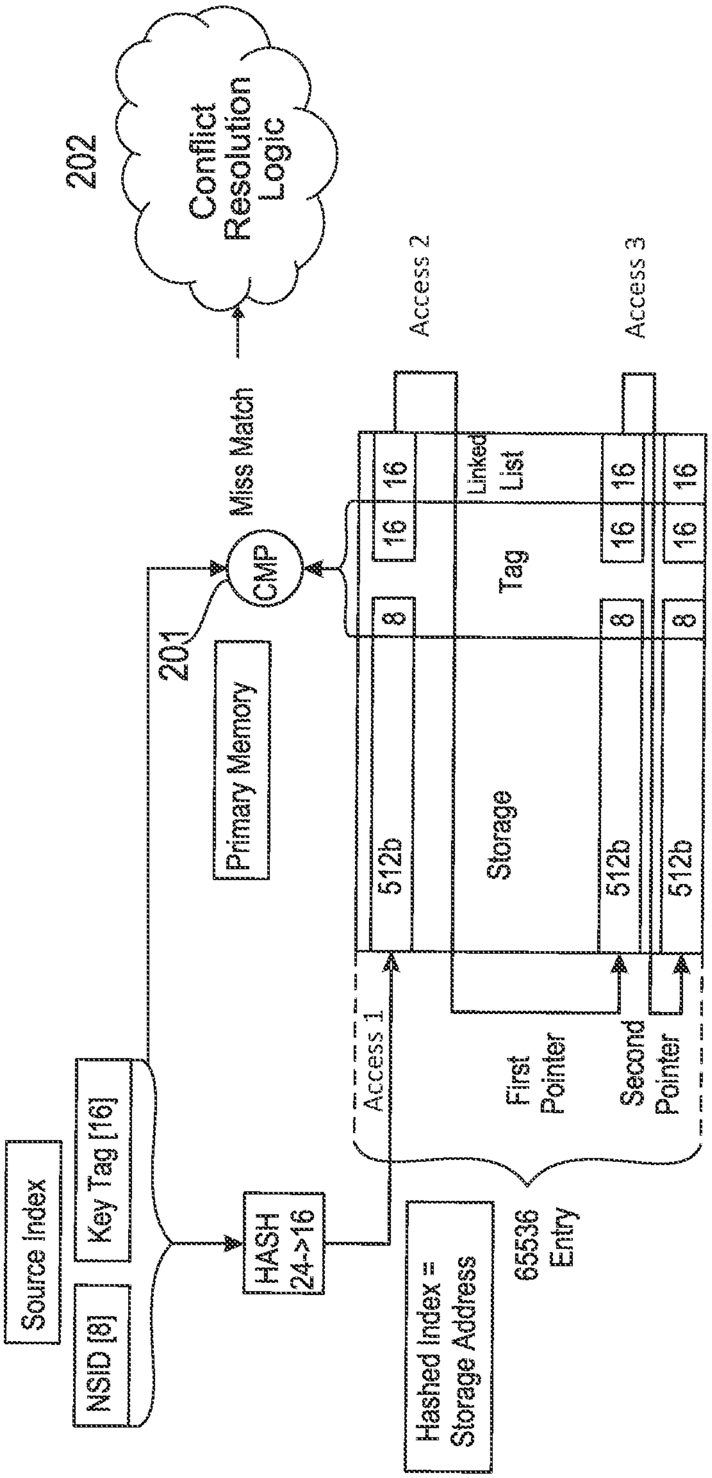
FIG. 2 is a block diagram illustrating hash conflict resolution, according to an embodiment.

FIG. 2 is a block diagram illustrating hash conflict resolution, according to an embodiment. Throughout FIG. 2, some of the components include a number of bits or bytes corresponding to each component (e.g., NSID [8]). The number of bits or bytes corresponding to each component is exemplary and is provided to aid in the understanding of the drawings. In particular, the size of each of the components may be used for illustrative purposes to help understand the physical relationships among components. The actual number of bits, bytes, or entries for each component may vary, depending on the needs of the system.

Hash conflict resolution using a linked list may merge separate chaining linked lists with a hash table to save memory space for unused slots in a primary memory. Hash conflict resolution may be applied to a KPIO system, such that a source index (an NSID and key tag) is hashed and used to identify a storage address corresponding to an encryption or decryption key stored in DRAM.

The operations described in FIG. 2 may be performed by a controller stored in memory, a processor, or computer-implemented instructions.

Referring to FIG. 2, a source index comprising an NSID and key tag may be hashed from 24 to 16 bits to generate a hashed index. The hashed index represents a storage address of the primary memory (e.g., a hash table). At step 201, a tag portion (e.g., 24 bits) is compared (e.g., by a controller) to the NSID (e.g., 8 bits) and key tag (e.g., 16 bits) representing the storage address of the primary memory. The tag portion may represent a local address of the primary memory entry and is compared with the source index comprising the NSID and key tag. As shown in FIG. 2, the 24 bit tag stored in memory storage is compared with the source index (e.g., NSID (8 bits) and key tag (16 bits)) at step 201 that a conflict exists (a mismatch), and conflict resolution logic may be performed at step 202. For example, a first pointer may be assigned to link access 1 to another storage address in the primary memory, access 2. In addition, a second pointer may be assigned to link access 2 to another storage address in the primary memory, access 3. An entry included in the primary memory may be accessed using a cache index.

Access 1, access 2, and access 3 denote access attempts to an entry of the primary memory. Each access attempt may initiate the following sequence:

1. Check the entry(i)'s {NSID(i),KeyTag(i)} pair is matched to the IO command's Source-index {NSID, KeyTag} pair;
2. If matched, the 512 b encryption key will be used; and
3. Else if not matched, the link to the next entry will be used for a next access attempt, access(i+1), where "i" denotes an entry of the primary memory.

Figure 3:
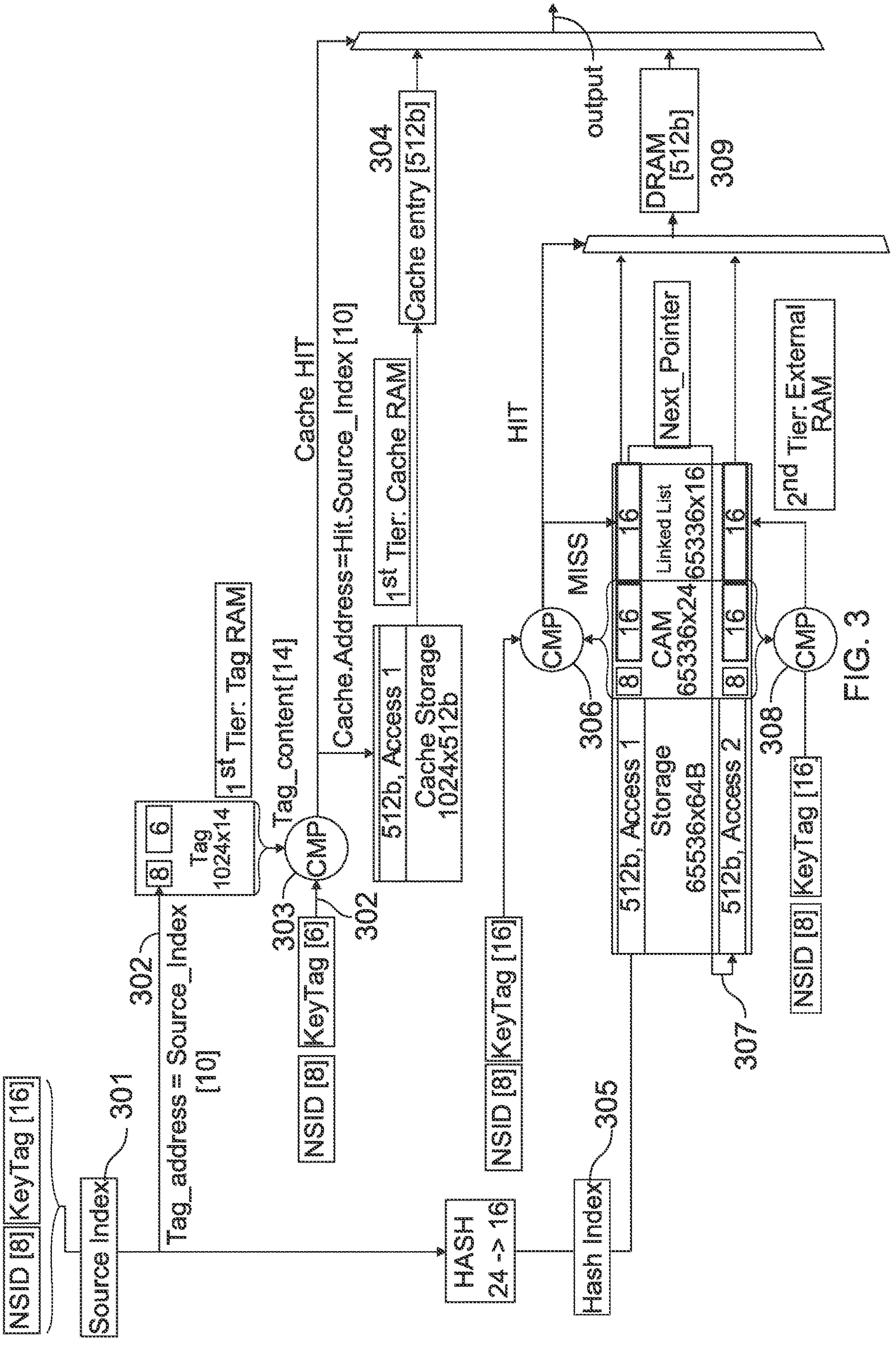
FIG. 3 is a block diagram illustrating a partial source index as a tag index, according to an embodiment.

FIG. 3 is a block diagram illustrating a partial source index as a tag index, according to an embodiment. Throughout FIG. 3, some of the components include a number of bits or bytes corresponding to each component (e.g., NSID [8]). The number of bits or bytes corresponding to each component is exemplary and is provided to aid in the understanding of the drawings. In particular, the size of each of the components may be used for illustrative purposes to help understand the physical relationships among components. The actual number of bits, bytes, or entries for each component may vary, depending on the needs of the system.

Referring to FIG. 3, a 24 bit source index 301 is provided. The 10 lower bits (e.g., least significant bits (LSBs)) of the source index 301 are used as a tag address 302. Here, the tag address is 10 bits because the tag RAM (cache storage) includes 1024 entries, and log 2(1024)=10. The remaining 14 bits of the source index 301 are stored in the 1$^{st}$ tier: tag RAM (cache storage) so that the total memory size is 1024×14 bits. Once the 14 bits are indexed, the value may be output from the tag RAM as tag_content (the term "tag_content" may be used interchangeably with the term "tag memory content") and compared with the corresponding bits of NSID[8] keytag[6] from the source index in step 303 to determine whether there is a conflict. If there is no conflict (cache hit or match), then a corresponding cache 304 entry may be output from cache storage. In this manner, the cache storage is used to improve the hit rate for outputting a storage entry, for example, systems in which valid entries are linearly allocated (e.g., KPIO systems).

If there is a conflict in step 303, then a valid entry is not output via 1$^{st}$ tier cache RAM. In this case, 2$^{nd}$ tier external RAM is accessed to identify a valid entry by hashing the source index 301 to 16 bits and providing it as a hash index 305. The hash index 305 may be 16 bits and represent a storage address of the 2$^{nd}$ tier: external RAM. At step 306, a tag portion of access 1 is compared (e.g., by a controller) to the hashed index of the NSID and key tag representing the storage address of the memory. The tag portion of access 1 may represent a local address of the access 1 in a memory entry and is compared with the source index comprising the NSID and key tag. If there's a match, then a corresponding entry may be output from the 2$^{nd}$ tier: external RAM at step 309. If there's a conflict (miss match) in step 306, the next pointer may be assigned to link access 1 with access 2 in the storage device in step 307.

In step 308, a tag portion of access 2 is compared (e.g., by the controller) to the hashed index of the NSID and key tag representing the storage address of the memory. If no conflict is identified in step 308 (match), then the entry may be output from the 2nd tier: external RAM and provided as output at step 309.

The time it takes to output an entry via cache memory (at step 304) versus DRAM (at step 309) is notably different. As discussed below, cache memory may be accessed and an entry output much faster than using DRAM to perform the same. Thus, using cache memory to output an entry is preferable because it has much less latency.

A characteristic of KPIO may be that a KPIO key in each NS may be linearly incremented upon allocation. For example, if a lower address of each NS is used as an index, then each NS may point to a first index (e.g., index 1), and a 1 tier: tag RAM, as provided in FIG. 3, may only store one NS entry (e.g., 1 NS entry of the 256 NS entries).

Figure 4:
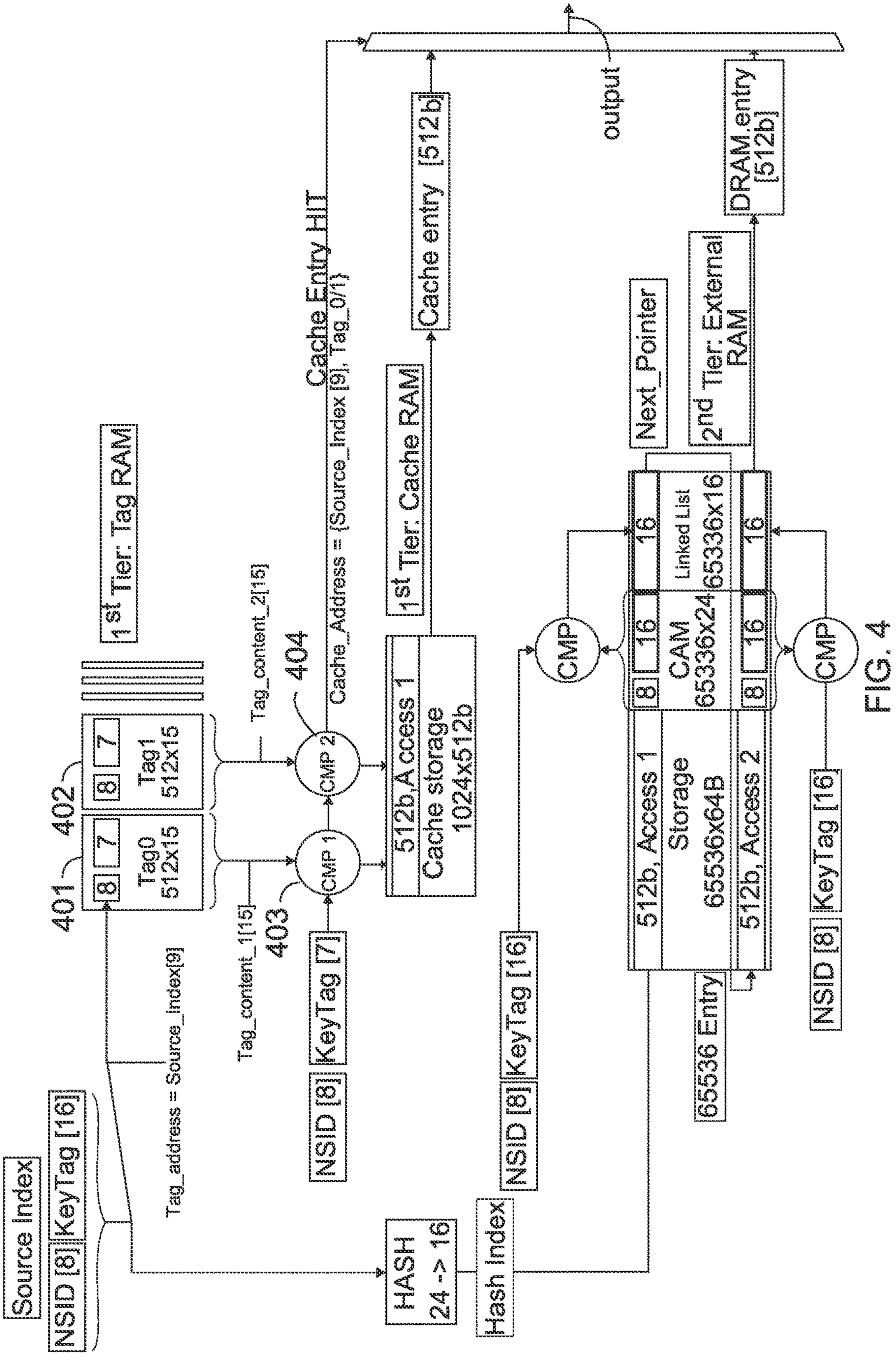
FIG. 4 is a block diagram illustrating a multi-way tag address index, according to an embodiment.

FIG. 4 is a block diagram illustrating a multi-way tag address index, according to an embodiment. Throughout FIG. 4, some of the components include a number of bits or bytes corresponding to each component (e.g., NSID [8]). The number of bits or bytes corresponding to each component is exemplary and is provided to aid in the understanding of the drawings. In particular, the size of each of the components may be used for illustrative purposes to help understand the physical relationships among components. The actual number of bits, bytes, or entries for each component may vary, depending on the needs of the system.

FIG. 4 includes a number of components that are similar to FIG. 3. Therefore, for convenience of description, similar descriptions of components may be omitted from the description of FIG. 4.

Referring to FIG. 4, the 1st tier: tag RAM is provided as a multi-way tag address. As shown in FIG. 4, the 1st tier: tag RAM is duplicated into two tag addresses (Tag0 and Tag1). Accordingly, a first entry 401 and a second entry 402 may be cached in the LSB to one tag address, thereby increasing the hit rate (since, for example, 256 NS entries may be used to provide a match for two entries instead of one). Further, the 1st tier: tag RAM may also be divided into partitions other than two. For example, the 1st tier: tag RAM may be allocated as having four entries cached to the LSB, thereby increasing the hit rate even further (since, for example, 256 NS entries may be used to provide a match for four entries instead of two).

At steps 403-404, a multi-way cache memory comparison is performed. At step 403, a comparison between tag content (e.g., tag_content_1[15]) and a portion of the source index (e.g., NSID[8] KeyTag[7]) is performed. At step 404, a comparison between tag content (e.g., tag_content_2[15]) and a portion of the source index (e.g., NSID[8] KeyTag[7] is performed. A multi-way cache memory comparison is notably different than a traditional cache comparison and a hash cache comparison, as described above, because as shown in steps 403-404, a 2-way traditional cache comparison is a comparison between two values: 1. Two entries (401 and 402) of the Tag_Address access/index Tag Memory Contents (15 bits) and 2. A portion of the Source Address (15 bits=24 bits−9 bits). Also, the tag address may be 9 bits since 10 LSBs of source index−1 bit to distinguish among duplicated tag addresses Tag0 and Tag1.

Additionally, other multi-way cache memory comparisons are possible. For example, a 4-way traditional cache compares between two values: 1. Four entries of the Tag_Address access/index Tag Memory Contents (16 bits) and 2. A portion of the Source Address (16 bits=24 bits−8 bits). Also, the tag address may be 8 bits since 10 LSBs of source index−2 bits to distinguish among 4 duplicated tag addresses.

Additionally, a configurable x-way traditional cache memory comparison is possible. For example, an x-way traditional cache compares between two values: 1. X entries of the Tag_Address access/index Tag Memory Contents (14+Log 2(X) bits) and 2. A portion of the Source Address (24 bits−Tag_Address width (e.g., the Tag_Address width may be a function of the number of duplicated tag addresses)). Also, the tag address may be equal to 10−log 2(x).

Figure 5:
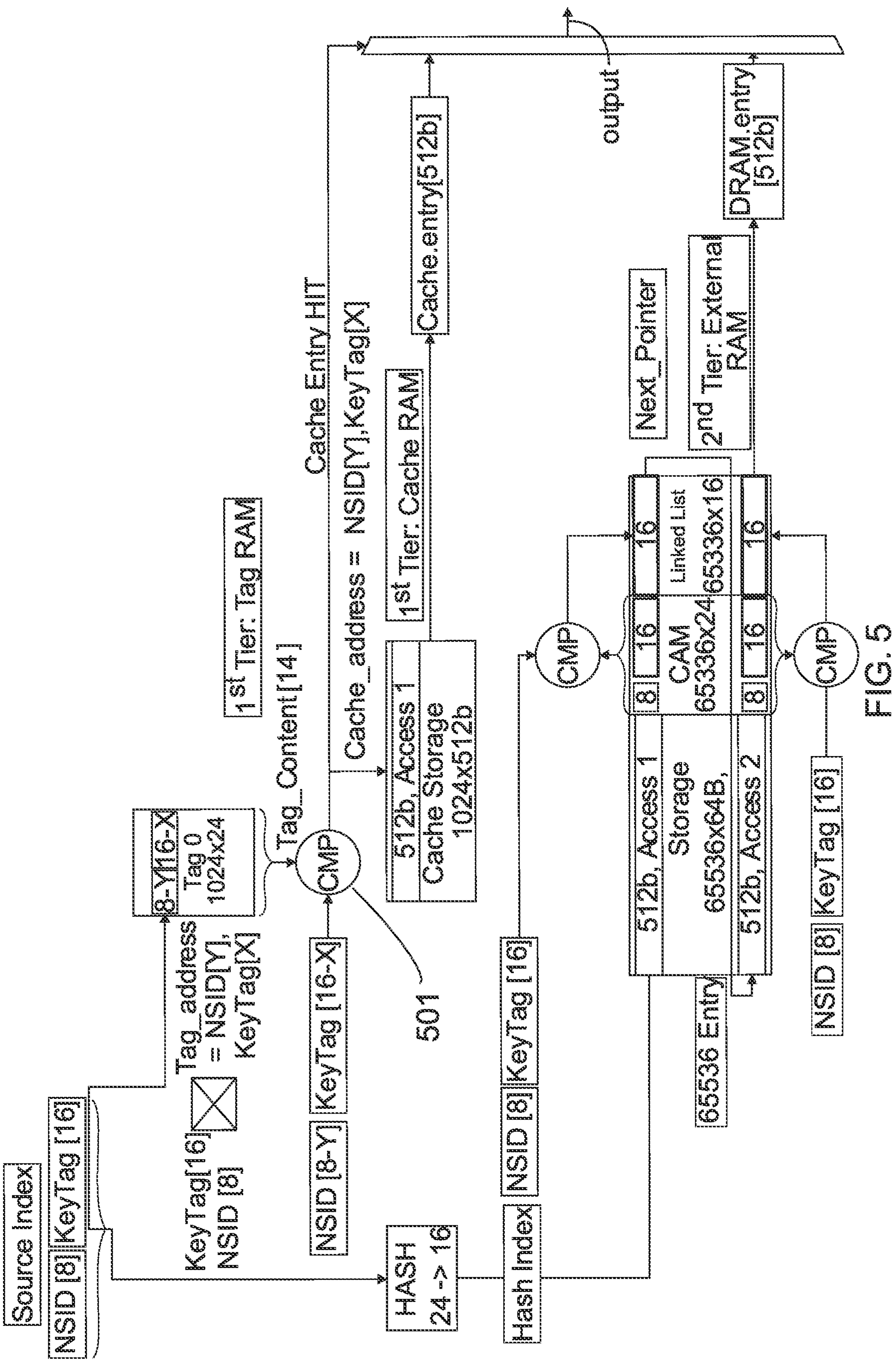
FIG. 5 is a block diagram illustrating a source index configurable to be mapped to a tag address, according to an embodiment.

FIG. 5 is a block diagram illustrating a source index configurable to be mapped to a tag address, according to an embodiment. Throughout FIG. 5, some of the components include a number of bits or bytes corresponding to each component (e.g., NSID [8]). The number of bits or bytes corresponding to each component is exemplary and is provided to aid in the understanding of the drawings. In particular, the size of each of the components may be used for illustrative purposes to help understand the physical relationships among components. The actual number of bits, bytes, or entries for each component may vary, depending on the needs of the system.

FIG. 5 includes a number of components that are similar to FIGS. 3-4. Therefore, for convenience of description, similar descriptions of components may be omitted from the description of FIG. 5.

Referring to FIG. 5, the 1st tier: tag RAM is provided as a configurable source index mapped to a tag address. Instead of using an LSB to identify a tag address, a part of the NSID[8] of the source index (denoted as "NSID[Y]") and a part of the keytag[16] of the source index (denoted as "KeyTag[X]") may be used to identify a tag address of the cache index. Accordingly, a part of the NSID bit can be a part of the tag address, which may reduce the likelihood of their being a conflict since the tag address is reconfigurable. For example, 7 LSBs of the NSID and 3 LSBs of the keytag may be used to identify the tag entry, and the remaining 14 bits may represent the tag content. Thus, at step 501 a configurable x-way traditional cache memory comparison may be performed.

The configurable source index may allow the multiple namespaces having valid entries to be identified using the cache index. Each valid entry may be incrementally identified for each namespace, starting from zero.

According to an embodiment, a hashed source address may be used as a cache tag address. Using the hashed source address as the tag address may improve the hit rate (e.g., a lower possibility of a conflict) for the linear increment source address problem. For example, a valid address may be spread evenly across the cache address space and lower a possibility of a conflict to less than 10%. In addition, an LSB of the hashed source address (hash index) may be used as the tag address (a cache tag address).

Figure 6:
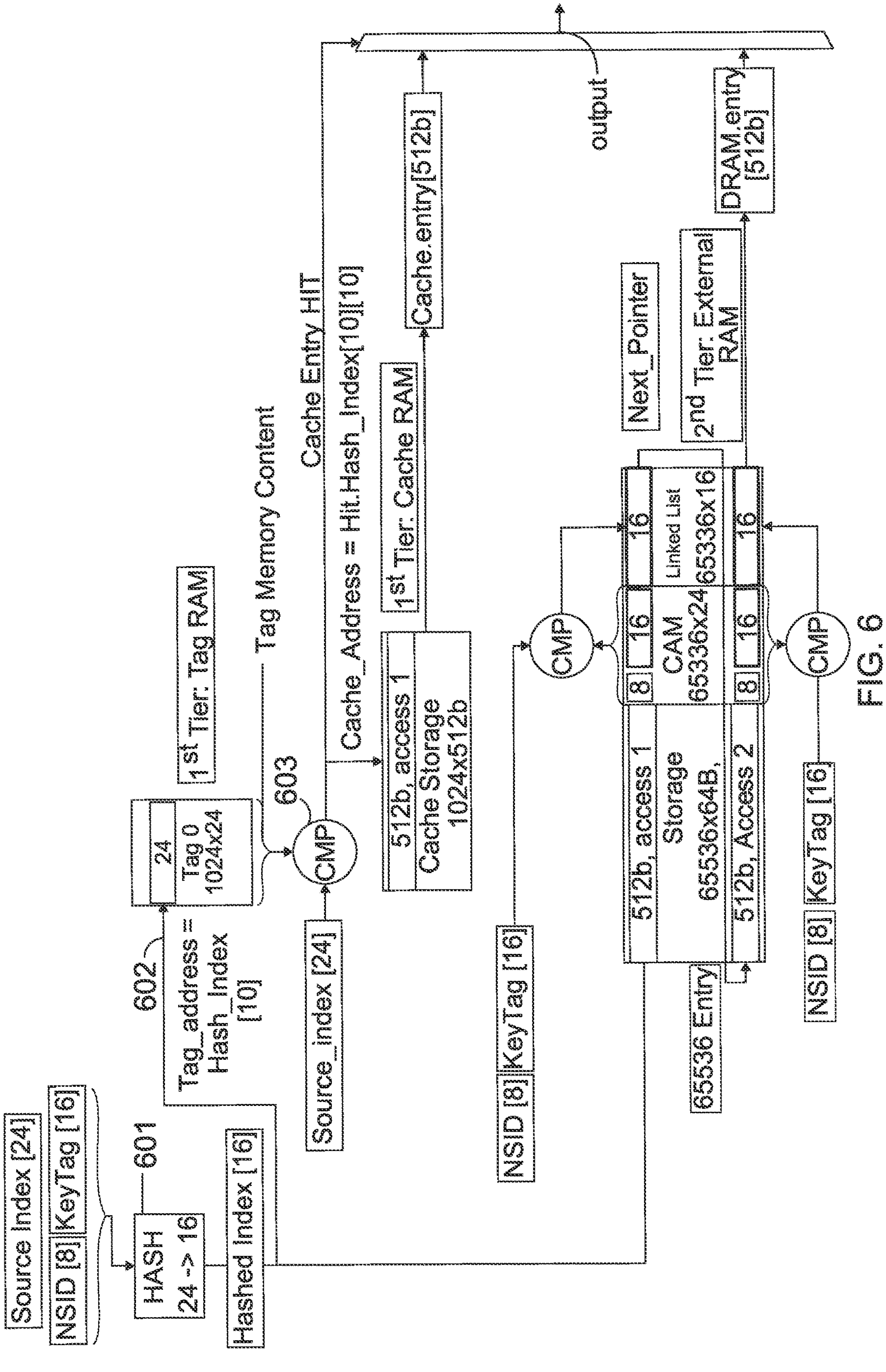
FIG. 6 is a block diagram illustrating using a hashed index as a tag address, according to an embodiment.

FIG. 6 is a block diagram illustrating using a hashed index as a tag address, according to an embodiment. Throughout FIG. 6, some of the components include a number of bits or bytes corresponding to each component (e.g., NSID [8]). The number of bits or bytes corresponding to each component is exemplary and is provided to aid in the understanding of the drawings. In particular, the size of each of the components may be used for illustrative purposes to help understand the physical relationships among components.

The actual number of bits, bytes, or entries for each component may vary, depending on the needs of the system.

FIG. 6 includes a number of components that are similar to FIGS. 3-5. Therefore, for convenience of description, similar descriptions of components may be omitted from the description of FIG. 6.

Referring to FIG. 6, a source index is hashed from, for example, 24 bits to 16 bits at step 601. At step 602, an entry corresponding to the tag address of the $1^{st}$ tier: tag RAM is set to be equal to a predetermined number of bits (e.g., 10 bits) of the hashed source index. At step 603, the tag memory content (24 bits) is compared to the source index (24 bits to determine whether a valid entry is stored in cache.

Hashing the source index may include the added benefit of a valid entry corresponding to the hashed index[16] as not being linear (e.g., a hashed valid entry is more likely to be spread across 1 tier: tag RAM in a randomized manner), thereby resolving the linear-increment allocation problem of KPIO, discussed above, since entries included in a name space will not be incremented linearly. In other words, the source index may have its entropy crowded to the LSBs. After hashing, however, the hashed source index's entropy may be spread equally across each of the hashed bits. In addition, hashing advantageously reduces the total number of bits (e.g., from 24 bits to 16 bits), thereby minimizing the size of a valid NS entry.

Although hashing the source index resolves the linear increment problem and also reduces the total number of bits to minimize the size of a valid NS entry, a tradeoff may be that the values comprising the hash index may not necessarily be unique, thus the possibility of a hash conflict may still exist.

According to an embodiment, a solution to avoiding a hash conflict may be to use the whole tag address to designate the most significant bit (MSB) to perform cache identification to determine whether a conflict exists.

Figure 7:
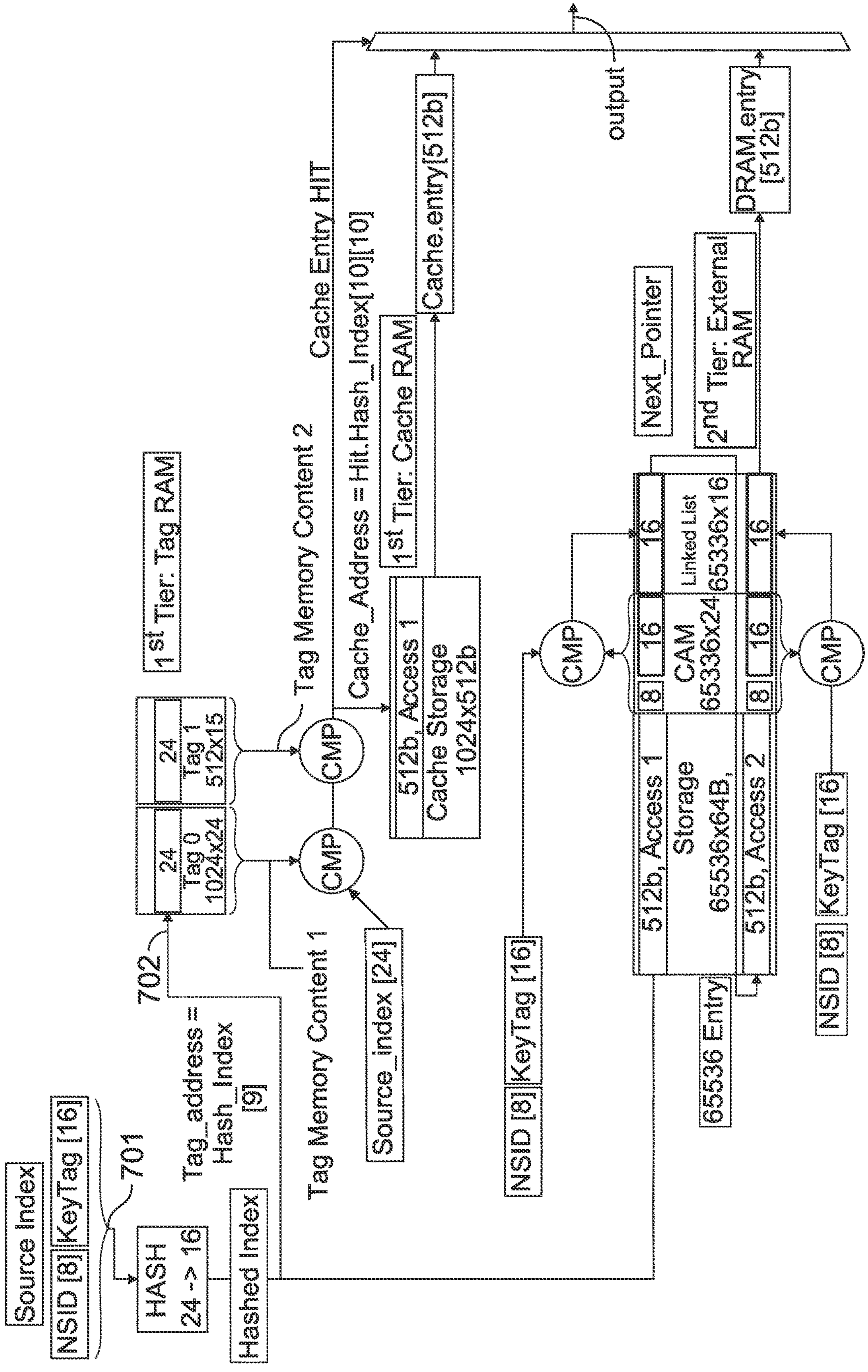
FIG. 7 is a block diagram illustrating a multi-way hashed index as a tag address, according to an embodiment.

FIG. 7 is a block diagram illustrating a multi-way hashed index as a tag address, according to an embodiment. Throughout FIG. 7, some of the components include a number of bits or bytes corresponding to each component (e.g., NSID [8]). The number of bits or bytes corresponding to each component is exemplary and is provided to aid in the understanding of the drawings. In particular, the size of each of the components may be used for illustrative purposes to help understand the physical relationships among components. The actual number of bits, bytes, or entries for each component may vary, depending on the needs of the system.

FIG. 7 includes a number of components that are similar to FIGS. 3-6. Therefore, for convenience of description, similar descriptions of components may be omitted from the description of FIG. 7.

Referring to FIG. 7, because the source index 701 is hashed from 24 bits to 16 bits, and associated with a tag address at 702, then the possibility of a hash conflict using the hash address increases, thereby reducing the hit rate (less likely to be a match). Accordingly, a solution similar to that described with respect to FIG. 4 may be employed by comparing the source index with tag memory content (e.g., Tag 0), which is then compared with tag memory content (e.g., Tag 1) to determine wither the cache storage includes a valid entry.

Figure 8:
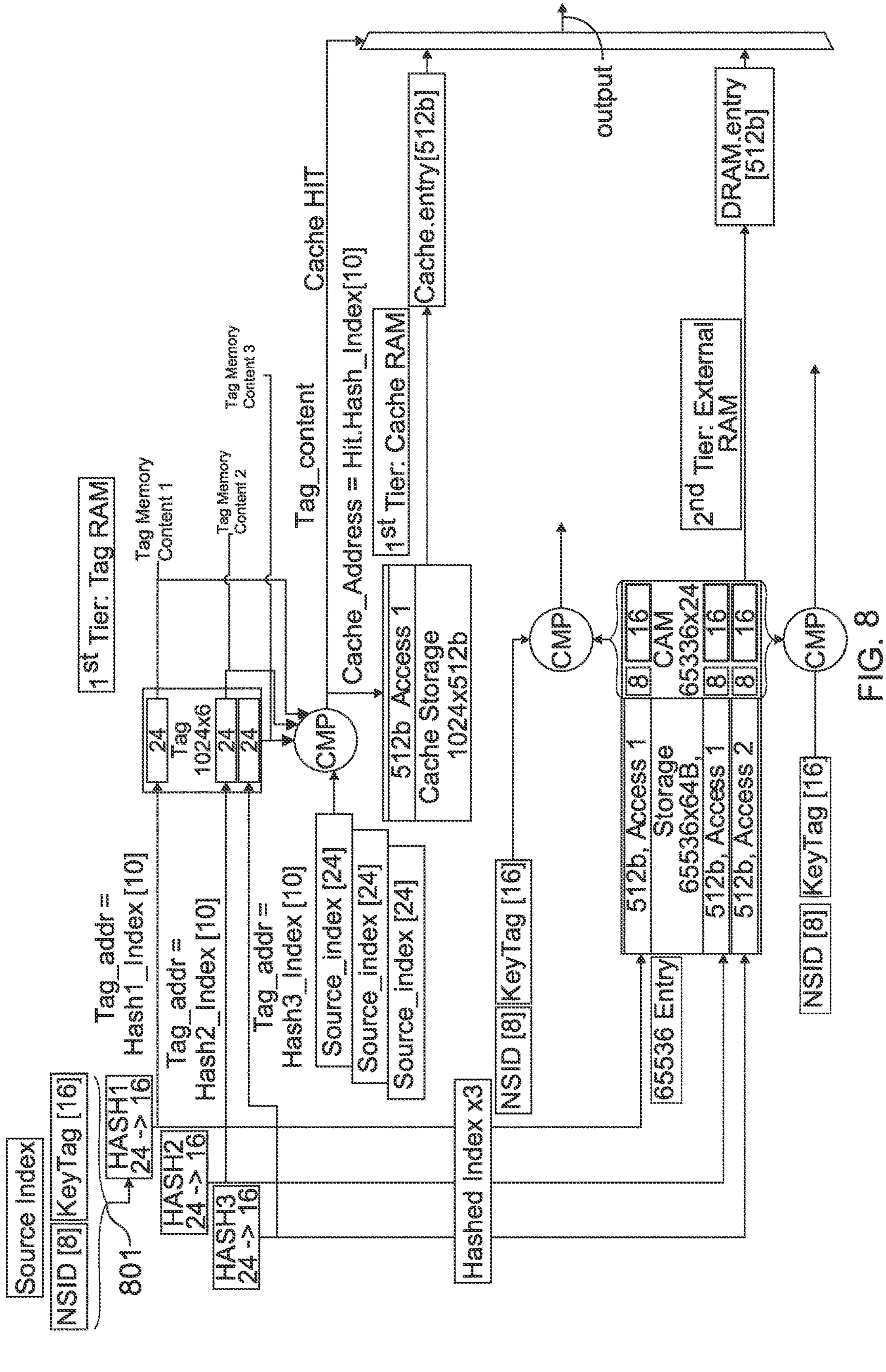
FIG. 8 is a block diagram illustrating a double hash as a cache index, according to an embodiment.

FIG. 8 is a block diagram illustrating a double hash as a cache index, according to an embodiment. Throughout FIG. 8, some of the components include a number of bits or bytes corresponding to each component (e.g., NSID [8]). The number of bits or bytes corresponding to each component is exemplary and is provided to aid in the understanding of the drawings. In particular, the size of each of the components may be used for illustrative purposes to help understand the physical relationships among components. The actual number of bits, bytes, or entries for each component may vary, depending on the needs of the system.

FIG. 8 includes a number of components that are similar to FIGS. 3-7. Therefore, for convenience of description, similar descriptions of components may be omitted from the description of FIG. 8.

Referring to FIG. 8, performing a double hash function may reduce the likelihood of there being a tag conflict in cache, and improve the hit rate (least likely to result in a miss match). At step 801, the source index is hashed from 24 bits to 16 bits using a first hash function. If the 16 bit first hash entry conflicts with the entry in the tag index, then the source index may be hashed from 24 to 16 bits using a second hash function to identify a second entry location in the tag index. If the 16 bit second hash entry conflicts with the second entry location of the tag index, the source index may be hashed from 24 to 16 bits using a third hash function to identify a third entry location in the tag index. Therefore, so long as the 1 tier: tag RAM is not fully occupied, the cache is nearly guaranteed to have a location to store the entry. Additionally, tag memory content 1, tag memory content 2, and tag memory content 3 are compared to the source index to determine whether the cache memory includes the valid entry.

In addition, the $2^{nd}$ tier: external RAM may use a hashing function when outputting an entry. In this case, since the hashing function is being used by the $2^{nd}$ tier: external RAM, it may be reused as the first, second and third hash functions for hashing the source index from 24 to 16 bits.

In addition, the hashing function is not limited to hashing to or from 24 to 16 bits, and it may hash to a predetermined number of bits greater or lower than 16 when performing hashing.

FIG. 9 illustrates a table comparing the benefits of the embodiments provided by FIGS. 3-8, according to an embodiment.

FIG. 9 includes a number of values and percentages that are provided by way of example in order to show the relative effects of the embodiments provided by FIGS. 3-8. The values and percentages shown in FIG. 9 are not limited to those which are displayed, and various other values and percentages may be employed.

The process of accessing a memory address may be called performing a "hop" or "jump". Each time a compare function is used, a hop or jump is performed. FIG. 9 compares an average total amount of time (Max 140 ns) for performing 3 hops for each of the embodiments provided by FIGS. 3-8. The average total amount of time is a function of the cache hit rate, hash conflict, and time it takes to access $1^{st}$ and $2^{nd}$ tier memories. Since $1^{st}$ tier memory may be provided as SRAM, the time it takes to access SRAM may be 5 ns. Since $2^{nd}$ tier memory is provided as DRAM, the time it takes to access DRAM may be 70 ns.

FIG. 10 illustrates a table comparing the sizes of the memories provided by FIGS. 3-8, according to an embodiment.

FIG. 10 includes a number of values pertaining to the sizes of the memories provided by the embodiments provided by FIGS. 3-8. The values shown in FIG. 10 are not limited to those which are displayed, and various other values and percentages may be employed.

Figure 11:
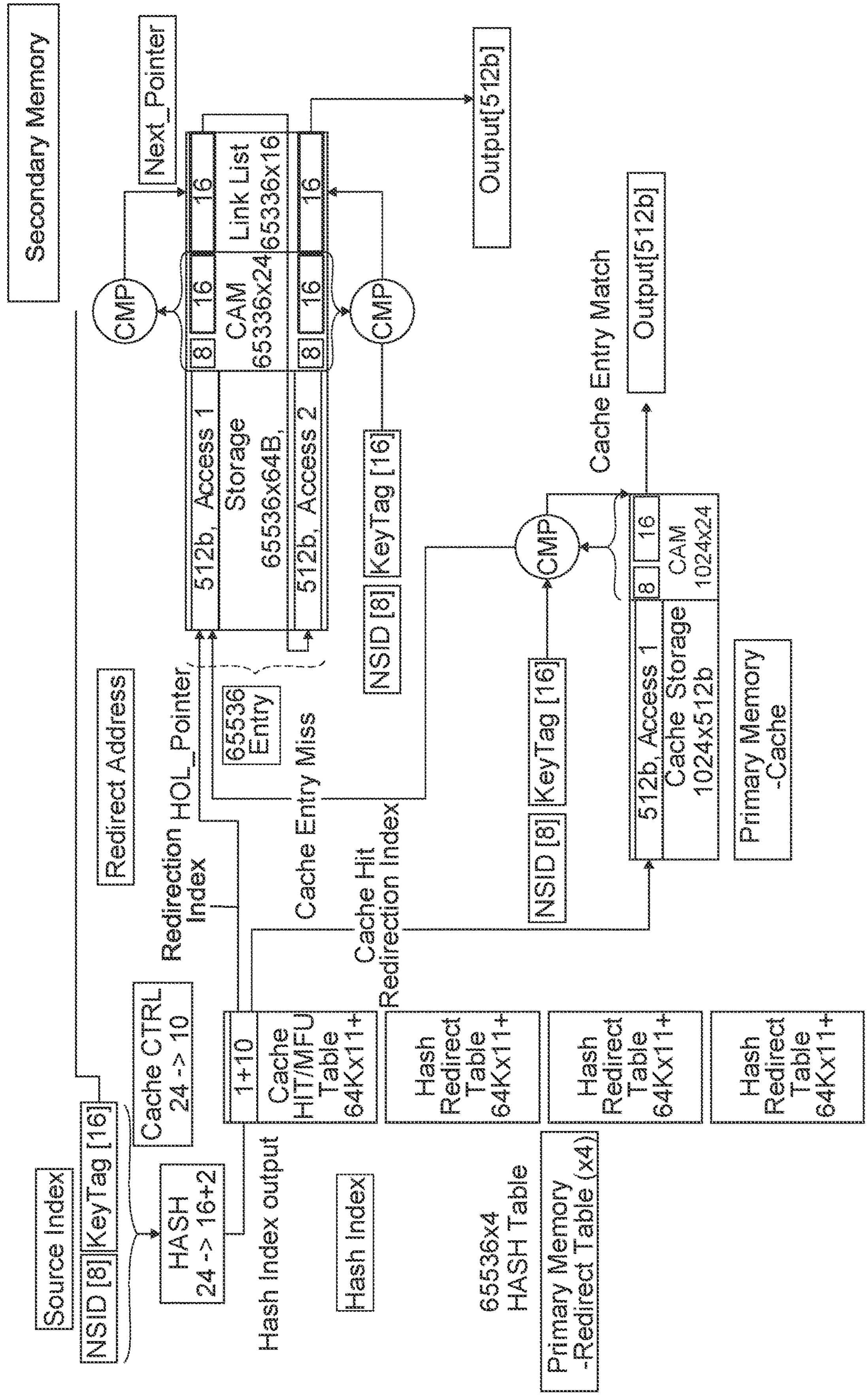
FIG. 11 is a block diagram illustrating a redirection table to access a cache entry, according to an embodiment.

FIG. 11 is a block diagram illustrating a redirection table to access a cache entry, according to an embodiment. Throughout FIG. 8, some of the components include a number of bits or bytes corresponding to each component (e.g., NSID [8]). The number of bits or bytes corresponding to each component is exemplary and is provided to aid in the understanding of the drawings. In particular, the size of each of the components may be used for illustrative purposes to help understand the physical relationships among components. The actual number of bits, bytes, or entries for each component may vary, depending on the needs of the system.

FIG. 11 includes a number of components that are similar to FIGS. 3-8. Therefore, for convenience of description, similar descriptions of components may be omitted from the description of FIG. 11.

Referring to FIG. 11, the hash table is composed of a 65536×4 bit hashed index redirection table (hash redirect table), which significantly reduces the size of the memory because the likelihood of a conflict is reduced by a factor of 4 by using the hashed index redirection table in combination with the cache storage in a primary memory. In this case, the primary memory may be composed of static read only memory (SRAM), and may be located on an IC (e.g., an ASIC) having read/write speeds that are faster than accessing a DRAM. The DRAM may be located off of the integrated circuit (IC) chip and may be large relative to the size of the SRAM. Thus, the hash redirect table may be referred to as an "on chip" hash redirect table that may quickly be accessed to obtain a redirect address.

The hash redirect table is a redirection index that redirects to an address of a cache storage. The hash redirect table is configured so that an entry of the hash redirect table points to a corresponding first entry in the cache storage. The input to the hash redirect table may be 18 bits, and the output may be 11 or more bits.

When the hash redirection table is used, the controller (e.g., the processor) may identify a redirection index using a hashed source index to point to the first entry of a corresponding entry in the storage memory (e.g., using a head of line (HOL) pointer). The redirection index may be used to identify a storage entry in the secondary memory without first accessing cache memory and, if the cache entry is a miss, then identifying the storage entry in the secondary memory. Thus, the redirection index speeds up the process of identifying the storage entry when it is stored in the secondary memory (e.g., when it is not stored in cache storage).

As shown in FIG. 11, after the source index is hashed from 24 bits to 16 bits, plus 2 bits for the hash redirect table, the 2 bits may be used to determine whether there is a cache hit or a cache miss. If there is a cache hit, then the hash redirect table may point to the cache storage device in primary memory to access an entry. However, if there is a cache miss, then the hash redirect table may point to secondary memory to lookup an entry. As discussed above, accessing (performing a lookup in) the secondary memory requires substantially more time than accessing the primary memory. Thus, the hash redirect table improves the lookup time because it reduces the likelihood that the secondary memory will need to be accessed by reducing the likelihood of a conflict.

As described above, the present application improves throughput in memory systems by providing a number of configurations that reduce the need to access slow off-chip memory for hash based KPIO systems, thereby improving throughput and latency, and reducing power consumption that would be necessary to operate a secondary memory (DRAM).

Figure 12:
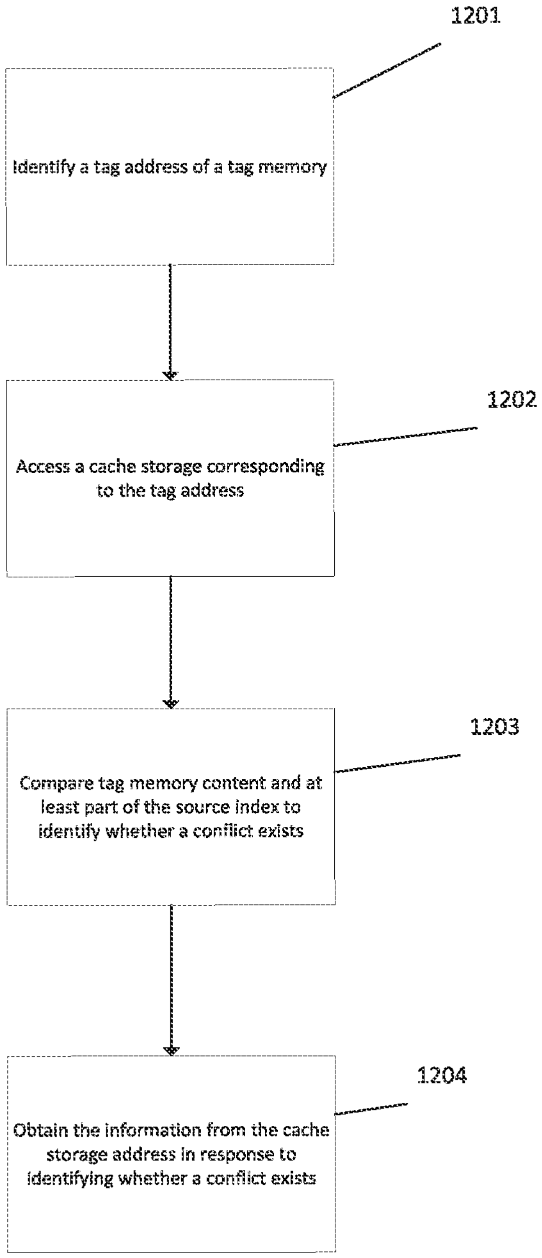
FIG. 12 is a flowchart illustrating accessing a stored memory, according to an embodiment.

FIG. 12 is a flowchart illustrating accessing a stored memory, according to an embodiment.

The steps described in FIG. 12 may be performed by a controller stored in memory, a processor, or computer-implemented instructions.

Figure 14:
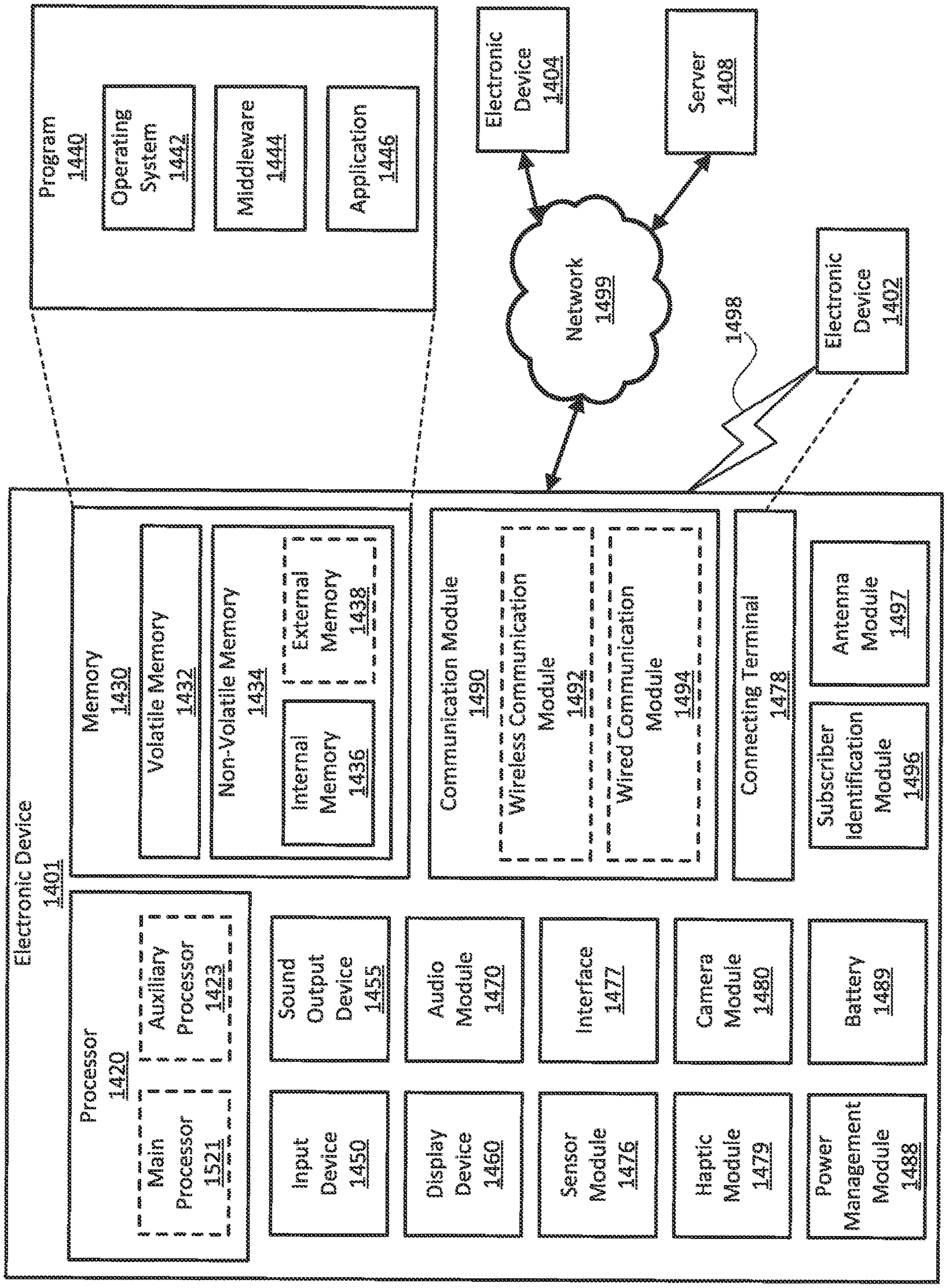
FIG. 14 illustrates an electronic device in a network environment, according to an embodiment.

Referring to FIG. 14, at step 1201 tag address of a tag memory is identified based, at least partially, on a source index including an NSID and a keytag.

In step 1202, a cache storage address corresponding to the tag address is accessed. The cache storage address may be included in a primary memory. The primary memory may be SRAM.

In step 1203, tag memory content is compared with at least part of the source index to identify whether a conflict exists. The tag memory content may be the same number of bits as the at least part of the source index.

In step 1204, information from the cache storage address is obtained in response to identifying whether a conflict does exist in step 1403. The obtained information may be an encryption or a decryption key (e.g., an entry) of a predetermined size (e.g., 512 bits).

If a conflict does not exist, then an entry may be obtained directly from the cache storage device. Otherwise, if a conflict does exist then a secondary memory (e.g., $2^{nd}$ tier: external ram or DRAM) may need to be accessed to obtain the appropriate entry for output.

If a conflict does exist, then a number of different options may ensue (e.g., folded linked list, secondary memory linked list, reroute table with a linked list, MFU with a linked list, sequential double hash conflict resolution, concurrent double hash conflict resolution, HOL reroute table with double hash conflict resolution, etc.).

Figure 13:
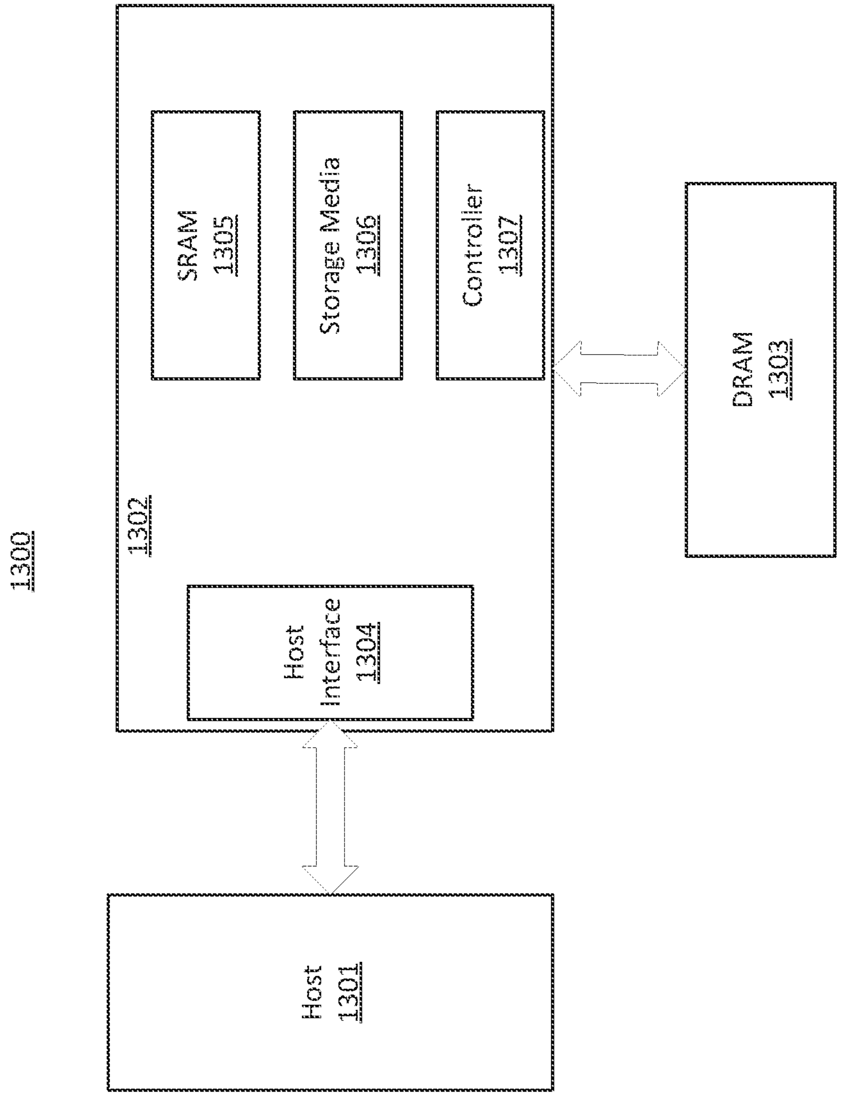
FIG. 13 is a memory system illustrating structural components for performing embodiments described in the present application, according to an embodiment.

FIG. 13 is a memory system illustrating structural components for performing embodiments described in the present application, according to an embodiment.

The operations described in FIGS. 1-12 may be performed by a controller stored in memory, a processor, or computer-implemented instructions. For instance, instructions performed by the controller may be implemented using as an FPGA, an ASIC, a general purpose computer, or by a remote processing system (e.g., a cloud computing system).

Referring to FIG. 13, a memory system 1300 capable of performing the embodiments described in the present application is shown. The memory system 1300 includes a host 1301, an IC 1302 (e.g., a memory buffer chip) and DRAM (e.g., a nonvolatile memory) 1303. Although DRAM is shown separate from the IC 1302, the DRAM may be included on the IC 1302.

The IC 1302 includes a host interface 1304, SRAM (e.g., a volatile memory) 1305, storage media (e.g., flash memory) 1306 and a controller 1307. The host interface 1304 may communicate information from the host 1301 to the IC 1302 or from the IC 1302 to the host 1301. The SRAM 1305 may be relatively small in size compared to the DRAM 1303. However, the SRAM 1305 may have faster read/write speeds than the DRAM 1303. In addition, the storage media 1306 may store data to be transmitted to or from the host 1301 and/or the DRAM 1303.

The embodiments described in the present application provide particular configurations to improve accessing stored information and, in particular, accessing stored information for KPIO systems. The storage system illustrated in FIG. 13 provides a structure for realizing the embodiments of the present application. It is noted, however, that the embodiments of the present application should not be limited to the structure of FIG. 13, as one of ordinary skill in the art would recognize that other memory storage systems may be applied to implement the embodiments of the present application.

FIG. 14 illustrates an electronic device in a network environment, according to an embodiment.

Referring to FIG. 14, the electronic device 1401, e.g., a mobile terminal including GPS functionality, in the network environment 1400 may communicate with an electronic device 1402 via a first network 1498 (e.g., a short-range wireless communication network), or an electronic device 1404 or a server 1408 via a second network 1499 (e.g., a long-range wireless communication network). The electronic device 1401 may communicate with the electronic device 1404 via the server 1408. The electronic device 1401 may include a processor 1420, a memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module (SIM) 1496, or an antenna module 1497 including a GNSS antenna. In one embodiment, at least one (e.g., the display device 1460 or the camera module 1480) of the components may be omitted from the electronic device 1401, or one or more other components may be added to the electronic device 1401. In one embodiment, some of the components may be implemented as a single IC. For example, the sensor module 1476 (e.g., a fingerprint sensor, an iris sensor, or an illuminance sensor) may be embedded in the display device 1460 (e.g., a display).

The processor 1420 may execute, for example, software (e.g., a program 1440) to control at least one other component (e.g., a hardware or a software component) of the electronic device 1401 coupled with the processor 1420, and may perform various data processing or computations. As at least part of the data processing or computations, the processor 1420 may load a command or data received from another component (e.g., the sensor module 1476 or the communication module 1490) in volatile memory 1432, process the command or the data stored in the volatile memory 1432, and store resulting data in non-volatile memory 1434. The processor 1420 may include a main processor 1421 (e.g., a central processing unit (CPU) or an application processor, and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or execute a particular function. The auxiliary processor 1423 may be implemented as being separate from, or a part of, the main processor 1421.

The auxiliary processor 1423 may control at least some of the functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to one embodiment, the auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input device 1450 may receive a command or data to be used by another component (e.g., the processor 1420) of the electronic device 1401, from the outside (e.g., a user) of the electronic device 1401. The input device 1450 may include, for example, a microphone, a mouse, or a keyboard.

The sound output device 1455 may output sound signals to the outside of the electronic device 1401. The sound output device 1455 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1460 may visually provide information to the outside (e.g., a user) of the electronic device 1401. The display device 1460 may include, for example, a display, a hologram device, or a projector and control circuitry to control a corresponding one of the display, hologram device, and projector. According to one embodiment, the display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. According to one embodiment, the audio module 1470 may obtain the sound via the input device 1450, or output the sound via the sound output device 1455 or a headphone of an external electronic device 1402 directly (e.g., wired) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. The sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device 1402 directly (e.g., wired) or wirelessly. According to one embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device 1402. According to one embodiment, the connecting terminal 1478 may include, for example, an HDMI connector, a USB connector, an SD card connector, or an audio connector (e.g., a headphone connector).

The haptic module 1479 may convert an electrical signal into a mechanical stimulus (e.g., a vibration or a movement) or an electrical stimulus which may be recognized by a user via tactile sensation or kinesthetic sensation. According to one embodiment, the haptic module 1479 may include, for example, a motor, a piezoelectric element, or an electrical stimulator.

The camera module 1480 may capture a still image or moving images. According to one embodiment, the camera module 1480 may include one or more lenses, image sensors, image signal processors, or flashes.

The power management module 1488 may manage power supplied to the electronic device 1401. The power management module 1488 may be implemented as at least part of, for example, a power management integrated circuit (PMIC).

The battery 1489 may supply power to at least one component of the electronic device 1401. According to one embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor) and supports a direct (e.g., wired) communication or a wireless communication. According to one embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or a standard of the Infrared Data Association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. According to one embodiment, the antenna module 1497 may include one or more antennas, and, therefrom, at least one antenna appropriate for a communication scheme used in the communication network, such as the first network 1498 or the second network 1499, may be selected, for example, by the communication module 1490 (e.g., the wireless communication module 1492). The signal or the power may then be transmitted or received between the communication module 1490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. All or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

One embodiment may be implemented as software (e.g., the program 1440) including one or more instructions that are stored in a storage medium (e.g., internal memory 1436 or external memory 1438) that is readable by a machine (e.g., the electronic device 1401). For example, a processor of the electronic device 1401 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of a memory device, comprising:
- hashing a source index comprising a combination of a namespace identification (NSID) and a keytag to obtain a hashed index using a hash function;
- identifying a tag address of a tag memory based, at least partially, on the hashed index;
- accessing a cache storage address corresponding to the tag address;
- comparing tag memory content and at least part of the source index to identify whether a match exists or whether a conflict exists; and
- in response to identifying whether the match exists or whether the conflict exists, obtaining information from the cache storage address.

2. The method of claim 1, wherein the cache storage address is comprised in a first memory, and
- wherein comparing the tag memory content and the at least part of the source index to identify whether the match exists or whether the conflict exists further comprises:
- in response to identifying that the match exists, outputting an entry corresponding to the cache storage address.

3. The method of claim 1, wherein multiple cache entries correspond to the tag address.

4. The method of claim 1, wherein the tag memory provides a reconfigurable tag address using at least one bit of a namespace identification (NSID) and at least one bit of a keytag.

5. The method of claim 1, wherein multiple cache entries correspond to the tag address.

6. The method of claim 1, wherein the hash function is a double hash function, and
- wherein hashing the source index to obtain the hashed index using the hash function comprises:
- generating a first hashed index by hashing the source index using a first double hash function,
- comparing the tag memory content and a full source address to identify whether the match exists or whether the conflict exists, and
- in response to identifying that the conflict exists, generating a second hashed index by hashing the source index using a second double hash function.

7. A system, comprising:
- a memory; and
- a controller configured to:
- hash a source index comprising a combination of a namespace identification (NSID) and a keytag to obtain a hashed index using a hash function;
- identify a tag address of a tag memory based, at least partially, on the hashed index;
- access a cache storage address corresponding to the tag address;
- compare tag memory content and at least part of the source index to identify whether a match exists or whether a conflict exists; and
- in response to identifying whether the match exists or whether the conflict exists, obtain information from the cache storage address.

8. The system of claim 7, wherein the cache storage address is comprised in a first memory, and
- wherein comparing, by the controller, the tag memory content and the at least part of the source index to identify whether the match exists or whether the conflict exists further comprises:
- in response to identifying that the match exists, outputting, by the controller, an entry corresponding to the cache storage address.

9. The system of claim 7, wherein multiple cache entries correspond to the tag address.

10. The system of claim 7, wherein the tag memory provides a reconfigurable tag address using at least one bit of a namespace identification (NSID) and at least one bit of a keytag.

11. The system of claim 8, wherein multiple cache entries correspond to the tag address.

12. The system of claim 8, wherein the hash function is a double hash function, and
- wherein hashing the source index to obtain the hashed index using the hash function comprises:
- generating, by the controller, a first hashed index by hashing the source index using a first double hash function,
- comparing, by the controller, the tag memory content and a full source address to identify whether the match exists or whether the conflict exists, and
- in response to identifying that the conflict exists, generating, by the controller, a second hashed index by hashing the source index using a second double hash function.

13. A storage device, comprising:
- a controller; and
- a storage medium,
- wherein the controller is configured to:
- hash a source index comprising a combination of a namespace identification (NSID) and a keytag to obtain a hashed index using a hash function;
- identify a tag address of a tag memory based, at least partially, on the hashed index;
- access a cache storage address corresponding to the tag address;
- compare tag memory content and at least part of the source index to identify whether a match exists or whether a conflict exists; and
- in response to identifying whether the match exists or whether the conflict exists, obtain information from the cache storage address.

14. The storage device of claim 13, wherein the cache storage address is comprised in a first memory, and
- wherein comparing, by the controller, the tag memory content and the at least part of the source index to identify whether the match exists or whether the conflict exists further comprises:

in response to identifying that the match exists, outputting, by the controller, an entry corresponding to the cache storage address.

15. The storage device of claim 13, wherein multiple cache entries correspond to the tag address.

16. The storage device of claim 13, wherein the tag memory provides a reconfigurable tag address using at least one bit of a namespace identification (NSID) and at least one bit of a keytag.

17. The storage device of claim 15, wherein the hash function is a double hash function, and wherein hashing the source index to obtain the hashed index using the hash function comprises:

generating, by the controller, a first hashed index by hashing the source index using a first double hash function, comparing, by the controller, the tag memory content and a full source address to identify whether the match exists or whether the conflict exists, and in response to identifying that the conflict exists, generating, by the controller, a second hashed index by hashing the source index using a second double hash function.

* * * * *